United States Patent [19]

Kendall

[11] Patent Number: 5,388,908
[45] Date of Patent: * Feb. 14, 1995

[54] APPARATUS FOR MEASURING THE TEMPERATURE OF MOLTEN METALS

[75] Inventor: Martin Kendall, Sheffield, England

[73] Assignee: Heraeus Electro-Nite International N.V., Houthalen, Belgium

[ * ] Notice: The portion of the term of this patent subsequent to May 11, 2010 has been disclaimed.

[21] Appl. No.: 26,724

[22] Filed: Mar. 5, 1993

[30] Foreign Application Priority Data

Mar. 6, 1992 [DE] Germany ............... 4207317

[51] Int. Cl.$^6$ ................ G01K 1/12; G01K 1/10
[52] U.S. Cl. ................ 374/140; 136/234
[58] Field of Search ........... 374/140, 139; 136/234, 136/230, 232, 233; 266/88

[56] References Cited

U.S. PATENT DOCUMENTS

| | | | |
|---|---|---|---|
| 3,232,794 | 2/1966 | Korton | 374/179 |
| 3,408,607 | 10/1968 | Davis | 136/233 |
| 3,554,816 | 1/1971 | Moen | 136/233 |
| 3,649,368 | 3/1972 | Sine | 136/232 |
| 3,996,071 | 12/1976 | Klicks et al. | 136/233 |
| 4,012,708 | 7/1978 | Dancy | 136/233 |
| 4,060,095 | 11/1977 | Kurita | 136/232 |
| 4,721,534 | 1/1988 | Phillippi et al. | 374/179 |
| 4,724,428 | 2/1988 | Brown, Jr. | 374/139 |
| 4,871,263 | 10/1989 | Wilson | 374/139 |
| 4,977,001 | 12/1990 | Grenspan | 374/208 |
| 4,984,904 | 1/1991 | Nakano et al. | 374/140 |
| 5,071,258 | 12/1991 | Usher et al. | 374/140 |
| 5,209,571 | 5/1993 | Kendall | 374/139 |

FOREIGN PATENT DOCUMENTS

| | | |
|---|---|---|
| 834757 | 2/1952 | Germany . |
| 1573271 | 6/1970 | Germany . |
| 1648261 | 5/1971 | Germany . |
| 7419633 | 10/1974 | Germany . |
| 2427992 | 3/1975 | Germany ............... 374/179 |
| 1113460 | 11/1968 | United Kingdom . |
| 2193375 | 2/1988 | United Kingdom . |

OTHER PUBLICATIONS

*Industrial Laboratory*, V. N. Zhuchin E. A. "Protective Sheath For Thermocouples Measuring the Temperature", No. 4, Apr. 1984, pp. 385–387.
Patent Abstracts of Japan, vol. 10, No. 237 (P–487)(2293) 15 Aug. 1986 & JP-A-61 068525 (08 Apr. 1986)(only abstract considered).

*Primary Examiner*—Diego F. F. Gutierrez
*Attorney, Agent, or Firm*—Panitch, Schwarze, Jacobs & Nadel

[57] ABSTRACT

Apparatus for measuring temperatures in molten metals are known with a thermocouple arranged in a closed-end ceramic tube, wherein the junction of the thermocouple is located near the closed end of the tube, and with an outer protective casing which surrounds the closed-end tube and forms an annulus between the closed-end tube and the inner surface of the protective casing, the protective casing being substantially refractory metal oxide and graphite. To create a temperature measuring apparatus in which the thermocouple is protected by simple means from chemical destruction and thereby increases the life expectancy of the thermocouple, the annulus is substantially filled with a metal oxide powder and an oxygen-reducing means, the proportion of the oxygen-reducing means being approximately 5% by volume to approximately 95% by volume.

13 Claims, 2 Drawing Sheets

APPARATUS FOR MEASURING THE TEMPERATURE OF MOLTEN METALS

FIELD OF THE INVENTION

The invention relates to an apparatus for measuring temperatures in molten metals with a thermocouple, which is arranged in a closed-end ceramic tube, wherein the junction of the thermocouple is located near the closed end of the tube, and with an outer protective structure which surrounds the closed-end tube while forming an annulus between the closed-end tube and the inner surface of the protective structure, the protective structure comprising substantially refractory metal oxide and graphite.

BACKGROUND OF THE INVENTION

Such apparatus are known, for example, from the German utility model GM 74 19 633. Described therein is a closed-end tube which encloses a thermocouple, in a protective structure of refractory metal oxide and graphite. Between the closed-end tube and the protective structure a ring slot is formed. The thermocouple, which is arranged in the closed-end tube, is made of expensive materials such as platinum, for use with the high temperatures existing in molten metal. Especially with continuous temperature measurements, which are necessary for constant control of the molten metal, the thermocouple is not fully protected inside the described apparatus, especially since reactive or corrosive gases enter through the structure which surround the thermocouple and can thereby destroy the structures and the thermocouple. Therefore multiple replacements of the thermocouple can become necessary. Under the influence of the high temperatures in the molten metals, silicon monoxide and carbon monoxide, for example, are formed within the protective structure of the apparatus, and these permeate the tube of aluminum oxide which surrounds the thermocouple. Hence, the carbon monoxide increases the porosity of this tube, whereby the tube is slowly destroyed. The silicon monoxide reacts with the thermocouple wire, so that this is destroyed and the temperature reading is faulty or can no longer be determined.

An additional apparatus of similar means is known from GB-B 2 193 375. This apparatus has a thermocouple with a closed end which is enclosed by an impermeable molybdenum tube coated with ceramic. This molybdenum tube is very expensive and is complicated to manufacture. In order to avoid destruction through thermomechanical stresses, the molybdenum tube is encased with several ceramic layers, which have an outwardly decreasing amount of molybdenum. These layers serve, among other things, to compensate for the temperature gradient along the molybdenum tube. These ceramic layers and the molybdenum tube can indeed also be destroyed by reactive gases, such as carbon monoxide or silicon monoxide.

SUMMARY OF THE INVENTION

The object of the present invention lies in the construction of a temperature measuring apparatus, wherein the thermocouple is protected by simple means from a chemical destruction and thereby the life expectancy of the thermocouple is increased.

The object is achieved by the invention, starting from the above-characterized apparatus, with the annulus being substantially filled with a metal oxide powder and an oxygen-reducing means, wherein the proportion of the oxygen-reducing means is approximately 5% by volume to approximately 95% by volume. This oxygen-reducing means prevents corrosive or reactive gases, such as silicon monoxide or carbon monoxide, from reaching the closed-end tube which surrounds the thermocouple, and from destroying this tube as well as the thermocouple itself. Silicon and carbon are formed upon oxidation of the reducing means, and these do not attack the thermocouple nor the surrounding tube.

Suitably, the oxygen-reducing means is in the form of a powder and mixed with the metal oxide powder. This allows a uniform distribution of the oxygen-reducing means in the annulus and ensures high effectiveness of the agent.

It is also possible to provide the oxygen-reducing means in the form of rods which are particularly arranged parallel to the closed-end tube. Also possible are embodiments of the oxygen-reducing means in the form of wires, pellets and/or granules, which are embedded in the metal oxide. Another possibility for placing the oxygen-reducing means in the annulus is to form this agent as a tube around the metal oxide powder. The tube can have closed or perforated cylinder walls. The tube-shaped arrangement of a powder is also possible. Also a combination of various forms of the oxygen-reducing means is possible.

Generally, the form of the reducing means is not restricted to the stated forms. Indeed, the reducing means should be distributed over the entire annulus to maximize effectiveness. It should only be avoided that the reducing means connects directly with the closed-end tube and the protective casing, since such a connection can lead to thermal bridges, which can subject the closed-end tube to an uneven thermomechanical load. A corresponding isolation from the metal oxide powder occurs.

The metal oxide powder which is located in the annulus may suitably comprise an oxide or a mixture of various oxides of the group aluminum oxide, magnesium oxide, zirconium oxide and titanium oxide. The use of aluminum oxide has proved especially suitable, since this is also very inexpensive.

Advantageously, the oxygen-reducing means comprises of at least one of the metals aluminum, magnesium, zirconium and titanium. Especially suitable is the use of aluminum due to its reduction potential. This material is also particularly inexpensive.

Suitably, the aluminum content, taken at the time of the filling of the annulus, should be approximately 15% by volume to 70% by volume, and preferably approximately 25% by volume to 65% by volume.

BRIEF DESCRIPTION OF THE DRAWINGS

The foregoing summary of the invention, as well as the following detailed description of preferred embodiments, will be better understood when read in conjunction with the appended drawings. For the purpose of illustrating the invention, there are shown in the drawings embodiments which are presently preferred, it being understood, however, that the invention is not limited to the specific arrangements and instrumentalities disclosed.

DETAILED DESCRIPTION OF PREFERRED EMBODIMENTS

Figure 1:
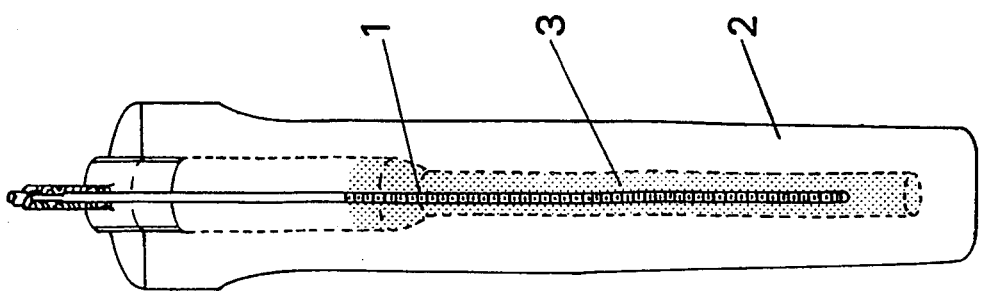
FIG. 1 is a schematic representation of the apparatus with oxygen-reducing powder.

The apparatus shown in FIG. 1 for measuring temperatures in molten metals has a thermocouple, which is arranged in the usual manner in a ceramic twin tube (not shown). This is surrounded by a closed-end aluminum oxide tube 1. The junction of the thermocouple is near the closed end of the aluminum oxide tube 1.

The closed-end aluminum oxide tube 1 is placed in a protective casing 2 made of refractory metal oxide, such as aluminum oxide and graphite. This protective casing 2 has for the insertion of the closed-end aluminum oxide tube 1 a hollow cavity longitudinal to the protective casing 2, which opens at the end of the protective casing 2 opposite from the closed immersion end. Through this so-formed opening the aluminum oxide tube 1 with the thermocouple is inserted into the protective casing 2. The diameter of the hollow cavity is approximately 8-15 mm larger than the diameter of the aluminum oxide tube 1. The thus-created annulus 3 is filled with a mixture of aluminum oxide powder and aluminum powder, wherein the proportion of the aluminum powder at the time of filling is approximately 40% to 50% by volume.

Figure 2:
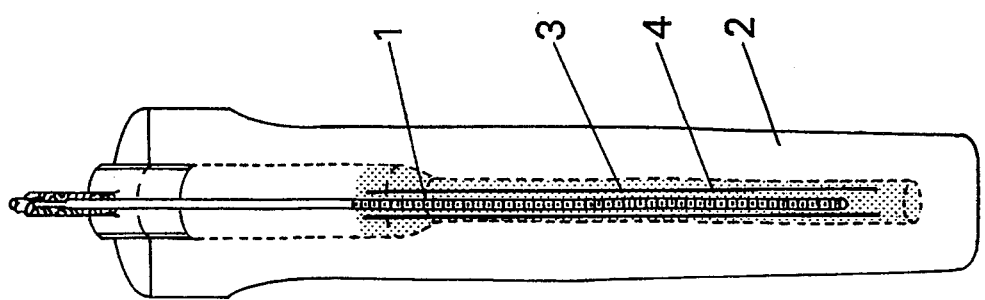
FIG. 2 is a schematic representation of the apparatus with rod-shaped oxygen-reducing means.

The apparatus shown in FIG. 2 is distinguished from that in FIG. 1 in that the reducing means is not in powder form but in the form of aluminum rods 4, which are arranged approximately parallel to the aluminum oxide tube 1, which encases the thermocouple. These aluminum rods 4 are embedded in the aluminum oxide powder. It is also possible to arrange the aluminum rods 4 in any other way, but the arrangement parallel to the aluminum oxide tube 1 is the most effective in respect to the reducing action.

Figure 3:
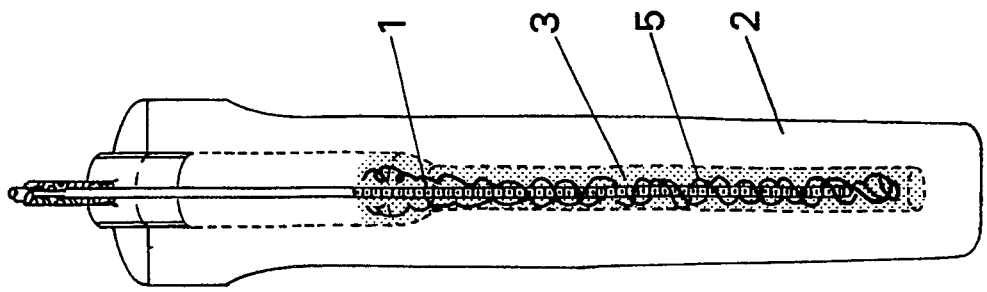
FIG. 3 is a schematic representation of the apparatus with wire-shaped oxygen-reducing means.

A similar apparatus is displayed in FIG. 3. The distinguishing feature of this apparatus is that the reducing means is arranged in the form of wires 5 in the aluminum oxide powder.

Figure 4:
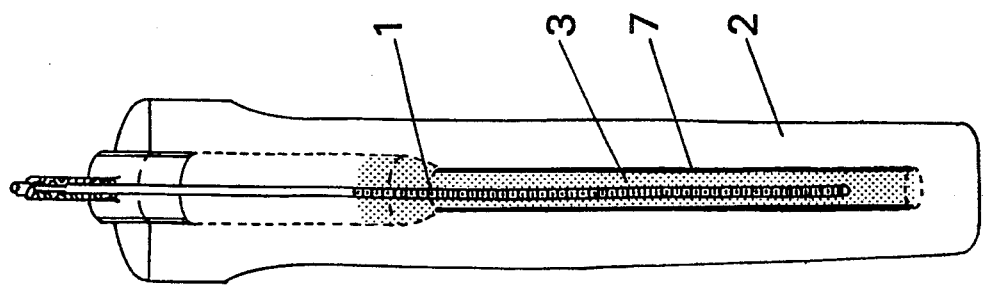
FIG. 4 is a schematic representation of the apparatus wherein the oxygen-reducing means has the shape of pellets or granules.

Another possible form of the oxygen-reducing means is illustrated in FIG. 4. Here the reducing means is in the form of pellets or granules 6 of aluminum embedded in the aluminum oxide powder.

Figure 5:
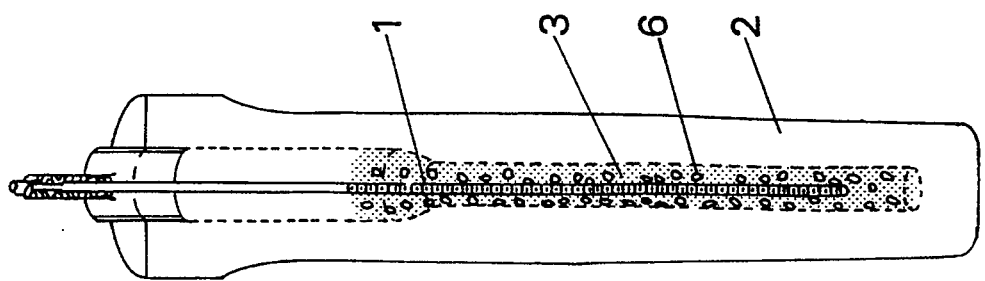
FIG. 5 is a schematic representation of the apparatus with tube-shaped arrangement of the oxygen-reducing means.
Figure 3:
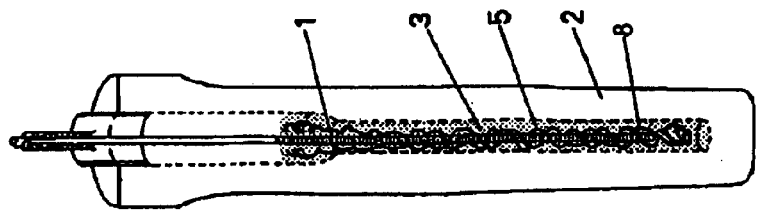
Figure 2:
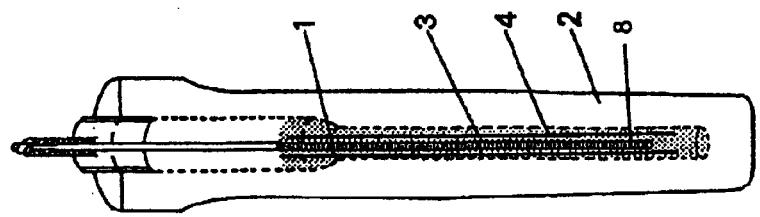
Figure 1:
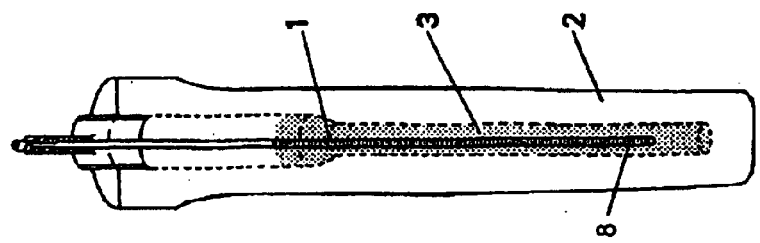

Another possibility is illustrated in FIG. 5, but this does not exhaust the multitude of possibilities of arranging the oxygen-reducing means. The oxygen-reducing means is arranged as an aluminum tube 7 around the aluminum oxide powder. In the drawing the aluminum tube 7 is only illustrated in cross-section. It can have cylinder walls which are closed or perforated in any desired manner. A tubular arrangement of metal powder is also possible.

During heating of the apparatus in the molten metal, as for example in molten steel, the oxygen-reducing aluminum melts. A downward running of the molten aluminum into the closed tip of the protective casing 2 is prevented in that the molten aluminum immediately enters into the hollow spaces made by the aluminum oxide powder and is thereby hindered from a downward movement.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for measuring temperatures in molten metals with a thermocouple, which is arranged in a closed-end ceramic tube, wherein the junction of the thermocouple is located near the closed end of the tube, and with an outer protective casing which surrounds the closed-end tube while forming an annulus between the closed-end tube and the inner surface of the protective casing, wherein the protective casing comprises substantially refractory metal oxide and graphite, characterized in that the annulus (3) is substantially filled with a metal oxide powder and an oxygen-reducing means, wherein the proportion of the oxygen-reducing means is approximately 5% by volume to approximately 95% by volume.

2. Apparatus for measuring temperatures according to claim 1 wherein the oxygen-reducing means is a powder and is mixed with the metal oxide powder.

3. Apparatus for measuring temperatures according to claim 1 whereby the oxygen-reducing means is in the form of a plurality of rods (4).

4. Apparatus for measuring temperatures according to claim 3 wherein the rods (4) are arranged approximately parallel to the longitudinal axis of the closed-end tube (1).

5. Apparatus for measuring temperatures according to claim 1 wherein the oxygen-reducing means is in the form of wires (5) which are embedded in the metal oxide powder.

6. Apparatus for measuring temperatures according to claim 1 wherein the oxygen-reducing means is in the form of pellets or granules (6) which are embedded in the metal oxide powder.

7. Apparatus for measuring temperatures according to claim 1 wherein the oxygen-reducing means surrounds the metal oxide powder as a tube.

8. Apparatus for measuring temperatures according to claim 1 wherein the metal oxide powder comprises an oxide selected from the group consisting of aluminum oxide, magnesium oxide, zirconium oxide, titanium oxide, and mixtures thereof.

9. Apparatus for measuring temperatures according to claim 1 wherein the oxygen-reducing means comprises a metal selected from the group consisting of aluminum, magnesium, zirconium and titanium.

10. Apparatus for measuring temperatures according to claim 1 wherein the metal oxide powder comprises aluminum oxide.

11. Apparatus for measuring temperatures according to claim 1 wherein the oxygen-reducing means is aluminum.

12. Apparatus for measuring temperatures according to claim 11, wherein the aluminum is present in an amount of approximately 15% by volume to 70% by volume at the time of filling of the annulus.

13. Apparatus for measuring temperatures according to claim 12, wherein the aluminum is present in an amount of approximately 25% by volume to 65% by volume.

* * * * *

(12) EX PARTE REEXAMINATION CERTIFICATE (7714th)
United States Patent
Kendall

(10) Number: US 5,388,908 C1
(45) Certificate Issued: Sep. 7, 2010

(54) APPARATUS FOR MEASURING THE TEMPERATURE OF MOLTEN METALS

(75) Inventor: Martin Kendall, Sheffield (GB)

(73) Assignee: Heraeus Electro-Nite Co., Langhorne, PA (US)

Reexamination Request:
No. 90/010,703, Oct. 1, 2009

Reexamination Certificate for:
Patent No.: 5,388,908
Issued: Feb. 14, 1995
Appl. No.: 08/026,724
Filed: Mar. 5, 1993

(30) Foreign Application Priority Data

Mar. 6, 1992 (DE) .............................. 4207317

(51) Int. Cl.
*G01K 1/10* (2006.01)
*G01K 1/081* (2006.01)

(52) U.S. Cl. ........................................ 374/140; 136/234
(58) Field of Classification Search .................. 374/140
See application file for complete search history.

(56) References Cited

U.S. PATENT DOCUMENTS

| | | | |
|---|---|---|---|
| 2,802,894 A | 8/1957 | Schneider et al. | |
| 2,915,575 A | 12/1959 | Thomas | 136/223 |
| 2,948,766 A | 8/1960 | Schneider | 136/232 |
| 3,116,168 A | 12/1963 | Gee | |
| 3,379,578 A | 4/1968 | McTaggart | 136/234 |
| 3,652,427 A | 3/1972 | Flood et al. | 205/783.5 |
| 3,821,030 A | 6/1974 | Darling | |
| 4,406,754 A | 9/1983 | Narita et al. | |
| 4,721,533 A | 1/1988 | Phillippi et al. | |
| 4,984,904 A | 1/1991 | Nakano et al. | 374/139 |
| 5,181,779 A | 1/1993 | Shia et al. | |
| 5,209,471 A | 5/1993 | Horiuchi et al. | |
| 5,474,618 A | 12/1995 | Allaire | |

FOREIGN PATENT DOCUMENTS

| | | |
|---|---|---|
| CN | 2063634 | 10/1990 |
| CN | 2708284 Y | 7/2005 |
| DE | 1648261 | 5/1971 |
| DE | 1648923 | 5/1971 |
| DE | 3112218 A1 | 2/1982 |
| DE | 3725615 C2 | 2/1988 |
| DE | 10106476 C1 | 10/2002 |
| GB | 1119338 | 7/1968 |
| GB | 1151019 | 5/1969 |
| JP | 60198423 | 7/1985 |
| JP | 61246636 | 11/1986 |
| JP | 8021768 A | 1/1996 |
| JP | 8271347 A | 10/1996 |
| JP | 11166865 A | 6/1999 |

OTHER PUBLICATIONS

Dieter Weber, et al. "Elektrische Temperaturmesung," 1991, p. 26.
Vesuvius "Accumetrix Continuous Temperature Measurement System," 1991 (brochure).
A.F. Holleman, et al. "Lehrbuch der Anorganischen Chemie," 1985, pp. 1062, 1067.

(Continued)

*Primary Examiner*—Pia Tibbits

(57) ABSTRACT

Apparatus for measuring temperatures in molten metals are known with a thermocouple arranged in a closed-end ceramic tube, wherein the junction of the thermocouple is located near the closed end of the tube, and with an outer protective casing which surrounds the closed-end tube and forms an annulus between the closed-end tube and the inner surface of the protective casing, the protective casing being substantially refractory metal oxide and graphite. To create a temperature measuring apparatus in which the thermocouple is protected by simple means from chemical destruction and thereby increases the life expectancy of the thermocouple, the annulus is substantially filled with a metal oxide powder and an oxygen-reducing means, the proportion of the oxygen-reducing means being approximately 5% by volume to approximately 95% by volume.

Amended

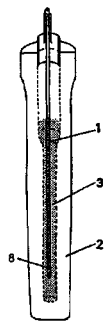

OTHER PUBLICATIONS

Rommps Chemie Lexicon, Franckh'sche Verlagshandlung, W. Keller & Co., Stuttgart, p. 1471 (1981).

Robert L. Powell et al., "Thermocouple Reference Tables Based on the IPTS–68," National Bureau of Standards, cover page and pp. 8–11 (Mar. 1974).

D. Bediones et al., "Criteria for the Selection of Thermocouples Versus RTD's in Industrial Applications," Instrument Society of America, cover page and pp. 1–3 (Oct. 1991).

Morrell, R., "Handbook of Properties of Technical & Engineering Ceramics: Part 1—An Introduction for the Engineer and Designer," National Physical Laboratory, cover page, copyright page and pp. 186–187 (1985).

Pollock, Daniel D., "Thermoelectricity: Theory Thermometry Tool," American Society for Testing and Materials, cover page and pp. 182–183 (Jan. 1985).

E.C. Magison, "Temperature Measurement in Industry," Instrument Society of America, cover page, copyright page and p. 41 (1990).

"Techniques for Approximating the International Temperature Scale of 1990," International Bureau of Weights and Measures, cover page pp. 99–101 (1990).

Spooner and Thomas, "Longer Life for Chromel–Alumel Thermocouples," *Metal Progress*, 1955, vol. 68, No. 5, American Society for Metals, Mt. Morris, Illinois.

Espe et al., "Getter Materials for Electron Tubes," *Electronics*, Oct. 1950, vol. XXIII, pp. 80–86, McGraw–Hill Publishing Company, New York, NY.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 13-18:

The apparatus shown in FIG. 1 for measuring temperatures in molten metals has a thermocouple, which is arranged in the usual manner in a ceramic twin tube (not shown). This is surrounded by a closed-end aluminum oxide tube 1. The junction of the thermocouple is near the closed end *8* of the aluminum oxide tube 1.

THE DRAWING FIGURES HAVE BEEN CHANGED AS FOLLOWS:

In FIGS. 1, 2, 3, a claimed element, the "hot junction", element 8 is shown.

AS A RESULT OF REEXAMINATION, IT HAS BEEN DETERMINED THAT:

The patentability of claims 1-13 is confirmed.

* * * * *